United States Patent Office 3,517,222
Patented June 23, 1970

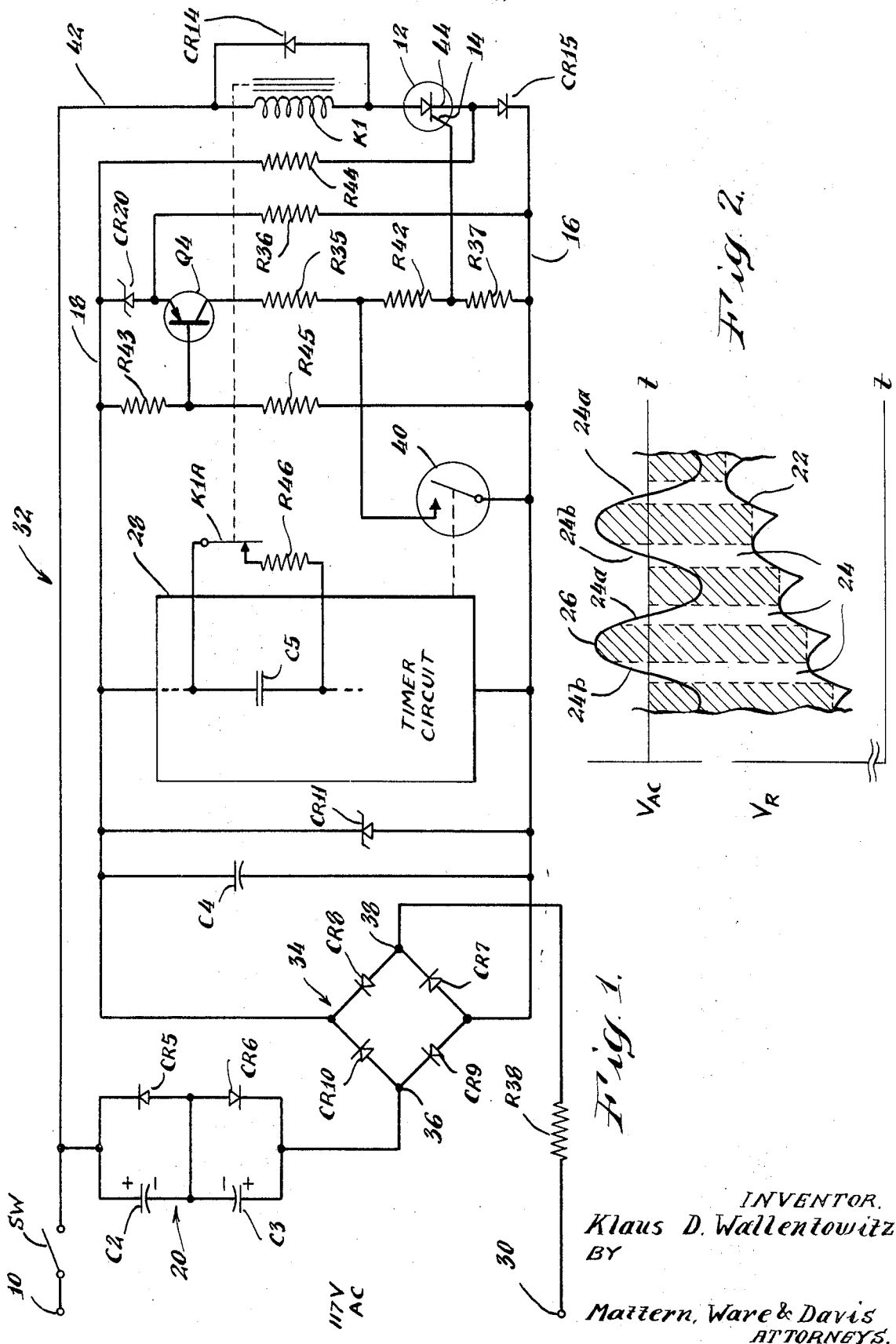

3,517,222
ELECTRONIC TIMER SYNCHRONIZED TO ALTERNATING CURRENT SUPPLY LINE
Klaus D. Wallentowitz, Waterbury, Conn., assignor to General Time Corporation, Stamford, Conn., a corporation of Delaware
Filed Mar. 6, 1967, Ser. No. 620,904
Int. Cl. H03k *17/00, 17/26, 17/28*
U.S. Cl. 307—293                            11 Claims

ABSTRACT OF THE DISCLOSURE

An electronic interval timer having a relay output. The relay is energized for a predetermined interval subsequent to the application of alternating current power to the circuit. The relay is controlled by a silicon-controlled rectifier and is operated from half-wave rectified alternating current. It, therefore, drops out, after the cessation of gate current to the SCR, a fixed interval subsequent to the last half-wave energizing it. The timer portion of the circuit is enabled, when the relay energizes. At the end of the timing interval, it shorts the SCR gate by means of an electronic switch.

Since the relay is energized with half-wave power, it can only energize during the positive portion of each alternating current cycle. An electronic switch to the SCR gate initially is enabled only during short intervals at the beginning of each quarter cycle. Thus, the relay will energize at a precise time near the beginning of a postiive half cycle. The enablement of the electronic switch is facilitated by a capacitive reactance voltage dropping circuit initially producing a relatively large amount of ripple on the DC supply to the switch which is 90 degrees out of phase wthi the applied alternating current. A Zener diode in circuit with the switch insures that it will only be operated above a predetermined potential.

A novel capacitive reactance voltage dropping circuit is disclosed which utilizes electrolytic capacitors connected in a bridge circuit with diodes across the alternating current supply terminals. A Zener diode in the DC supply stabilizes it immediately subsequent to timer initiation.

RELATED APPLICATIONS

The timer disclosed in the present application may utilize the bridge circuit timer invention disclosed and claimed in my co-pending application, Ser. No. 405,503, filed Oct. 21, 1964, entitled "Electronic Timer Circuit." That application is assigned to the same assignee as the present invention and is incorporated herein by reference.

The present invention was made during a program of electronic timer development at applicant's assignee's Industrial Controls Division Engineering Department and the following U.S. patent applications have resulted therefrom: The U.S. patent applications of Robert S. Lundin, Ser. No. 472,844, filed July 19, 1965, entitled "Condition Responsive Input Controllers"; Ser. No. 479,553, filed Aug. 13, 1965, entitled "Condition Responsive Process Timer"; Ser. No. 589,335, filed Oct. 25, 1966, entitled "Relay Circuit for Half-Wave Alternating Current Energization and Electronic Timer Employing the Same"; Ser. No. 590,707, filed Oct. 31, 1966, entitled "Electronic Timer Circuit"; my U.S. patent applications, Ser. No. 589,336, filed Oct. 25, 1966; Ser. No. 591,016, filed Oct. 31, 1966; the U.S. patent application of George J. Yagusic, entitled "Delay On De-Energization Electronic Timers," Ser. No. 595,993, filed Nov. 21, 1966; and the U.S. patent applications of Edward T. Bosman entitled "Electronic Timer Circuits," Ser. No. 595,955, filed Nov. 21, 1966, and Ser. No. 601,780, filed Dec. 14, 1966.

All of the above-identified applications are assigned to the same assignee as the present application and are incorporated herein by reference.

BACKGROUND OF THE INVENTION

This invention relates to an electronic timer synchronized with the alternating current supply therefor. More particularly, it relates to such a very accurate timer that may be utilized in an X-ray machine, or the like, and to an inexpensive low power consuming capacitive reactance voltage dropping circuit for use therewith.

Solid state electronic timers are replacing prior art mechanical and pneumatic timers in many applications due to their inherent high reliability, low power consumption, and the lowering cost of solid state components. One use for such an electronic timer is in original manufacturer's equipment such as X-ray machines. These machines utilize internal timers; that is, when the operator throws a switch, the X-ray tube must be energized for a predetermined time interval which determines the X-ray exposure.

The most important specification of such electronic timers is accuracy. It is not so important that the timer be immediately energized when the operator throws a switch, or that the operator be able to initiate a second time interval or exposure very soon after a prior one. Rather, the important thing is that the machine be turned on for a precisely determined time interval.

It is desirable that such electronic timers have low power consumption, not so much from the standpoint of reducing the amount of power required by the machine, but because high power consumption leads to the generation of large quantities of heat which adversely affect the electronic components of a timer and lead to timer inaccuracy.

Timers, according to the prior art, as exemplified in my above-identified co-pending application, Ser. No. 405,503, require direct current power for their operation. Thus, a power supply must be included in the timer to convert the alternating current available to the direct current required for the timer circuit. Furthermore, semi-conductor components utilize relatively low voltages, in the order of a few volts, and the alternating current power available in the United States generally is 117 volts. Thus, a lower voltage must be derived from the alternating current supply. One way of doing this is with a transformer. This method is prohibitively expensive. Another way of doing this is with a potential, or voltage, divider. Such a voltage divider generates a large amount of heat and consumes a large amount of power, which is undesirable for the foregoing reasons.

Another way of lowering the voltage, according to the prior art, is through the use of a capacitor in series with a resistor, or the resistance of the timer circuit. In such a circuit a large voltage drop may occur across the capacitor without any consumption of power or generation of heat. However, prior art circuits of this kind require large capacitors. Since these capacitors must be connected across the alternating current supply, according to the prior art, alternating current capacitors made from metal foil, or the like, have been used. Since relatively large capacitors are required, these are quite expensive. I have invented an alternating current voltage dropping circuit in which relatively less expensive direct current electrolytic capacitors are used.

In the development of the highly accurate timer disclosed herein, I realized that the relay circuit for energization from half-wave alternating current disclosed and claimed in the above-identified application of Robert S. Lundin, Ser. No. 589,335, always drops out a predetermined interval after the beginning of the negative portion of the alternating current cycle, subsequent to the cessation of gate current to the SCR. This effect may be utilized to synchronize the timing interval with the alternating current frequency to generate highly accurate time intervals. I have further invented a novel gate circuit for initiating the energization of such a half-wave energized relay in synchronism with the alternating current supply line.

One of the problems of prior art timers utilizing this relay is that if the silicon-controlled rectifier controlling it is gated late during the positive portion of the alternating current cycle, the relay will pull in but not enough energy will be stored in the relay coil to keep it energized during the succeeding negative half of the cycle. The relay will de-energize and be re-energized again at the beginning of the next succeeding positive half cycle. It will then remain energized throughout the remainder of the timing interval. This multiple energization adversely affects timing accuracy and may be detrimental to the output equipment controlled thereby.

SUMMARY OF THE INVENTION

It is, therefore, an object of the present invention to provide an accurate electronic timer.

Another object of the invention is to provide an electronic timer of the above character that consumes little electrical power.

A further object of the invention is to provide a an electronic timer of the above character for connection to an alternating current supply line.

A still further object of the invention is to provide an electronic timer of the above character in which the timing function is initiated through initial supply of alternating current thereto.

A yet further object of the invention is to provide an electronic timer of the above character utilizing an output relay energized from half-wave rectified alternating current.

Another object of the invention is to provide an electronic timer of the above character utilizing all solid state components.

Still another object of the invention is to provide an electronic timer of the above character that is rugged and reliable at low cost.

Yet another object of the invention is to provide an electronic timer of the above character for use in controlling X-ray machines.

A further object of the invention is to provide an electronic interval timer of the above character.

A still further object of the invention is to provide a low cost voltage dropping circuit.

A yet further object of the invention is to provide a voltage dropping circuit of the above character for alternating current.

Another object of the invention is to provide a voltage dropping circuit of the above character in an electronic timer of the above character.

Other objects of the invention will in part be obvious and will in part appear hereinafter.

The invention accordingly comprises the features of construction, combinations of electrical elements, and eletrcical circuit arrangements which will be exemplified in the electronic timer circuit herein disclosed. The scope of the invention is indicated in the claims.

In general, referring to FIG. 1, the low power consuming voltage dropping network of the present invention comprises a pair of polarized capacitors C2 and C3 connected at one terminal with like poles together across an alternating current supply line, in series with a direct current load. Diodes CR5 and CR6 are connected in shunt across capacitors C2 and C3 to form a bridge 20 so that alternating current may be applied thereto: the current passing, for example, from terminal 10 through switch SW through capacitor C2 and diode CR6 during the positive halves of the cycle, and through capacitor C3, diode CR5, switch SW and terminal 10 during the negative portions of the alternating current cycles.

The output relay K1 of the interval timer of the invention may only be energized during the positive half of an alternating current cycle through SCR 12 and only if gate 14 is positive enough with respect to the negative direct current supply bus 16. This occurs only when transistor Q4 conducts. Transistor Q4 will first conduct when the voltage across resistor R43 is identical with the operating voltage of the Zener diode CR20. This will occur when positive bus 18 is at approximately 15.5 volts potential with respect to negative bus 16. The capacitive reactance of the capacitor-diode bridge 20 insures that when switch SW is initially closed, the biasing potential between positive bus 18 and negative bus 16 has a substantially large amount of ripple as shown by curve 22 of FIG. 2. Since transistor Q4 will initially conduct only during one of the rising portions of the ripple curve 22, the gate 14 of SCR 12 will become positive enough for SCR 12 to conduct only during such rising portions, as shown by the open windows 24 of FIG. 2. Only during these windows can relay K1 initially energize. However, it cannot energize during those windows 24a where the alternating current voltage, as indicated by the curve 26, is crossing zero going negative because no current is supplied to the relay K1 during those portions of the cycle. Thus, relay K1 can only be energized for a short interval 24b at the beginning of the positive half of the AC cycle. When relay K1 is thus energized at the beginning of the positive half of the cycle, the timer circuit 28 is enabled by opening relay control switch K1A. This disconnects shuting resistor R46 from the timing capacitor C5 of a timer circuit 28.

THE DRAWING

For a fuller understanding of the nature and objects of the invention, reference should be had to the following detailed description taken in connection with the accompanying drawing in which:

FIG. 1 is a schematic electrical circuit diagram, partly in block form, of a highly accurate electronic timer according to my invention; and, FIG. 2 is a diagram of voltage versus time showing the relationship between the alternating current supply voltage 26 and the initially rising direct current ripple voltage 22 between buses 16 and 18.

SPECIFIC DESCRIPTION

Again referring to FIG. 1, the timer of the invention is adapted for connection to 117 volts alternating current supply at terminals 10 and 30. When switch SW is closed, power is supplied to the timer, generally indicated at 32. The alternating current power passes through the capacitive bridge 20, through a full-wave diode rectifier bridge 34, and through a low resistance surge protecting resistor R38. Direct current is thus supplied by the bridge 34 on direct current buses 16 and 18, as will be understood by those skilled in the art. A relatively large voltage drop occurs across the bridge 20 and the voltage between buses 16 and 18 can be maintained relatively low. In the steady state condition, it is limited to 18 volts by Zener diode CR11.

Capacitor C4 acts as a filter capacitor for the circuit. However, the circuit deliberately has relatively large ripple until the 18 volt operating potential is reached. Thus, when switch SW is initially closed, the potential appearing between buses 16 and 18 rises, as shown by curve 22 in FIG. 2, in sychronism with the alternating current potential, as shown by curve 26 of FIG. 2.

An electronic timer circuit 28, which, for example, may be the electronic timer circuit, shown in FIG. 2 of my above-identified application, Ser. No. 405,503, may derive its direct current power, as shown across buses 16 and 18. This electronic timer circuit 28 utilizes a timing capacitor C5 which, when the timer circuit is not timing, is shorted out by relay switch K1A which connects resistor R46 across it. The timing interval is initiated by opening switch K1A. At the end of the timing interval, the timer circuit 28 provides a signal for closing an electronic switch 40. Switch 40 may, for example, be a transistor, such as transistor T103 shown in FIG. 2 of my above-identified application, Ser. No. 405,503. The action of the electronic switch 40 is to short out the gate 14 of silicon-controlled rectifier 12 through which power is supplied to the output relay K1. Other contacts on relay K1, which are not shown, control the customer's equipment.

Relay K1 is energized from the alternating current supply via conductor 42 through the energization coil of relay K1, the silicon-controlled rectifier 12, a reverse biasing diode CR15, negative direct current bus 16, diode CR7 of diode bridge 34, and surge protecting resistor R38. The diodes CR15 and CR7 and the SCR 12 insure that only unidirectional current flows through relay K1. Once energized, relay K1 remains energized because during the negative portions of the alternating current cycle, current continues to flow through a shunting diode CR14. Relay K1 is thus self-energized in the manner fully explained in the above-identified application of Robert S. Lundin, Ser. No. 589,335.

When relay K1 is initially energized, it opens switch K1A to begin the timing interval. Once electronic switch 40 is opened at the end of the timing interval relay K1 drops out in a substantially constant time interval subsequent to the last positive portion of an alternating current cycle. This is because SCR12 is turned OFF at the end of such positive portion.

Relay K1 can energize initially only when gate 14 is positive with respect to cathode 44. This only occurs when current is flowing through resistors R35, R42 and R37. This current must flow through transistor Q4. When the timer is initially turned on, transistor Q4 does not conduct because its emitter to base junction is back-biased through the action of Zener diode CR20. Only when the voltage between bus 18 and 16 is approximately 15.5 volts will transistor Q4 begin to conduct. This will be a time during which there is a large ripple voltage between buses 16 and 18, as shown by curve 22 in FIG. 2. (Zener CR11 is not yet active.) Transistor Q4 will only turn on during the open unshaded windows 24, shown in FIG. 2. Since SCR12 can only turn on during a positive portion of the alternating current cycle, it can only be turned on at the beginning of a cycle during the windows 24b, shown in FIG. 2. Thus, the initiation of a timing cycle will also be synchronized with the alternating current cycle.

Diode CR15 back-biases SCR12. Resistor R44 provides current thereto for this purpose, as explained in my above-identified application, Ser. No. 591,016. Resistor R36 furnishes a current path for Zener diode CR20 when the circuit is first turned on.

An electronic timer, as shown in FIG. 1, for use in controlling an X-ray machine utilizes the following components: Capacitors C2 and C3 are each a 3 microfarad electrolytic capacitor. Diodes CR5, CR6, CR7, CR8, CR9, CR10 and CR14 are each 200 volt S2 diodes supplied by Semtech Corporation. Diode CR15 is a 200 volt TS2 diode supplied by Diodes, Inc. Zener diode CR11 is an 18 volt, 1 watt Zener; and Zener diode CR20 is a 6.8 volt, 1 watt Zener. Capacitor C4 is 100 microfarads while, for a 100 millisecond to ten second timer range, capacitor C5 is 47 microfarads. Transistor Q4 is a 2N1303; while SCR12 is a General Electric type C6B. Relay K1 is a 48 volt direct current relay. Resistor R35 is a 1 kilohm resistor; resistor R36, 6.8 kilohms; resistor R37, 1.2 kilohms; resistor R38, 10 ohms; resistor R42, 2.7 kilohms; resistor R43, 12 kilohms; resistor R45, 15 kilohms; and resistor R46, 27 ohms.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention, which, as a matter of language, might be said to fall therebetween.

Having described my invention, what I claim as new and desire to secure by Letters Patent is:

1. An electronic timer for connection to an A.-C. source of voltage comprising; timing means for establishing a precise time interval; timing initiating means for activating said timing means during a half cycle of positive polarity of the voltage from said A.-C. source, said timing initiating means including:
   (a) means for providing a step-wise rising potential in synchronism with said A.-C. source voltage,
   (b) means responsive to said step-wise rising potential to supply a gate signal when one of said steps exceeds a pre-determined potential, and
   (c) a controlled rectifier responsive to the coincidence of said gate signal with said half cycle of positive polarity of the A.-C. source voltage.

2. An electronic timer for connection to an A.-C. source for timing the energization of a relay comprising, in combination; switching means for connecting said A.-C. source to said timer; a D.-C. power supply connected for energization by the closing of said switching means to initially provide a voltage consisting of a rising D.-C. potential with a large A.-C. ripple component superimposed thereon, and upon reaching a predetermined energization level, to thereafter provide a reference D.-C. potential; gating means responsive to the achievement of a predetermined threshold level by a rising portion of said A.-C. ripple component for providing a control signal therefrom; timing initiating means including a controlled rectifier supplied with half wave rectified alternating current and responsive to said control signal to energize the relay; and timing means enabled by said timing initiating means for establishing the energization period of the relay and connected to bring about deenergization of the relay at the end of said energization period.

3. An electronic timer as defined in claim 1 wherein said gating means comprises:
   (a) a semiconductor switch having a reference terminal and a breakdown diode in circuit with said reference terminal.

4. An electronic timer as defined in claim 3 wherein said controlled rectifier is a silicon-controlled rectifier and said semiconductor switch is a transistor supplying gate current thereto.

5. An electronic timer as defined in claim 1 wherein said gating means turns on said controlled rectifier when said rising D.-C. potential of said power supply is near said reference D.-C. potential.

6. An electronic timer as defined in claim 5 and a breakdown diode connected to said D.-C. power supply for controlling said reference D.-C. potential.

7. An electronic timer as defined in claim 2 wherein said direct current power supply comprises a capacitive reactance voltage dropping circuit.

8. An electronic timer as defined in claim 7 wherein said captive reactance voltage dropping circuit comprises:
   (a) a pair of polarized capacitors, and
   (b) a pair of diodes connected thereto into a bridge circuit.

9. In an electronic timer for connection to an A.-C. source for timing the energization of a relay, the combination comprising, a D.-C. power supply connected to and energized by said A.-C. source to initially provide a supply voltage composed of a rising D.-C. potential with an A.-C. ripple component superimposed thereon and, upon reaching a predetermined energization level, to thereafter provide a reference D.-C. potential; gating means responsive to the achievement of a predetermined threshold level by said power supply voltage for effecting energization of the relay; and timing means responsive to the energization of the relay for establishing the energization period of the relay and connected for effecting de-energization of the relay at the end of said period.

10. In an electronic timer the combination according to claim 9 in which said predetermined threshold level of said power supply voltage is near said reference potential and in which said timing means is supplied by said D.-C. power supply such that the timing period for energization of the relay is initiated only after the power supply voltage for the timing means has reached a level near said reference potential, thereby providing increased accuracy in establishing the energization period of the relay.

11. An electronic timer circuit for connection to an A.-C. supply line, comprising in combination, a pair of input terminals having a switch connected in series therewith and arranged for switchable connection to the A.-C. supply line, a pair of D.-C. supply lines, means including a voltage dropping device connected across said input terminals, a full-wave rectifier and a filter operatively connected to said voltage dropping device and said D.-C. supply lines for building up and maintaining a reference D.-C. voltage on the D.-C. supply lines, a resistance-capacitance timer circuit coupled to the D.-C. supply lines, means responsive to the achievement of predetermined threshold voltage near said reference voltage on the D.-C. supply lines for initiating current flow to the resistance-capacitance timer circuit, thereby to insure that current does not flow in the resistance-capacitance circuit until said predetermined threshold voltage exists across the D.-C. supply lines.

References Cited

UNITED STATES PATENTS

| | | | |
|---|---|---|---|
| 3,154,725 | 10/1964 | Kadah | 307—293 XR |
| 3,202,884 | 8/1965 | Bullock | 307—293 XR |
| 3,296,419 | 1/1967 | Sels | 307—252 XR |
| 3,335,291 | 8/1967 | Gutzwiller | 307—252 |

JOHN S. HEYMAN, Primary Examiner

J. ZAZWORSKY, Assistant Examiner

U.S. Cl. X.R.

307—227, 252, 269